(12) United States Patent
Lee

(10) Patent No.: US 6,908,704 B2
(45) Date of Patent: Jun. 21, 2005

(54) METHOD OF MANUFACTURING SECONDARY BATTERY

(75) Inventor: Chan-hee Lee, Busan Metropolitan (KR)

(73) Assignee: Samsung SDI Co., Ltd., Suwon-si (KR)

(*) Notice: Subject to any disclaimer, the term of this patent is extended or adjusted under 35 U.S.C. 154(b) by 296 days.

(21) Appl. No.: 10/267,856

(22) Filed: Oct. 10, 2002

(65) Prior Publication Data

US 2003/0099879 A1 May 29, 2003

(30) Foreign Application Priority Data

Nov. 29, 2001 (KR) ........................................ 2001-74955

(51) Int. Cl.[7] .......................... H01M 6/10; H01M 10/00
(52) U.S. Cl. .......................... 429/94; 429/72; 429/124; 429/127; 429/162; 429/163; 429/164; 29/623.1; 29/623.3
(58) Field of Search .......................... 429/94, 72, 124, 429/127, 162, 163, 164; 29/623.1, 623.3

(56) References Cited

U.S. PATENT DOCUMENTS 6,558,438 B1 * 5/2003 Satoh et al. ............... 29/623.1

* cited by examiner

*Primary Examiner*—Patrick Joseph Ryan
*Assistant Examiner*—Angela J. Martin
(74) *Attorney, Agent, or Firm*—Stein, McEwen & Bui, LLP

(57) ABSTRACT

A method of manufacturing a secondary battery includes preparing a winding-type electrode assembly by interposing a separator between a positive electrode plate and a negative electrode plate and winding the same, initially charging the electrode assembly to remove the gas generated during charging, sealing the initially charged electrode assembly in a battery case, and fully charging the sealed electrode assembly.

19 Claims, 4 Drawing Sheets

FIG. 2F
FIG. 2A
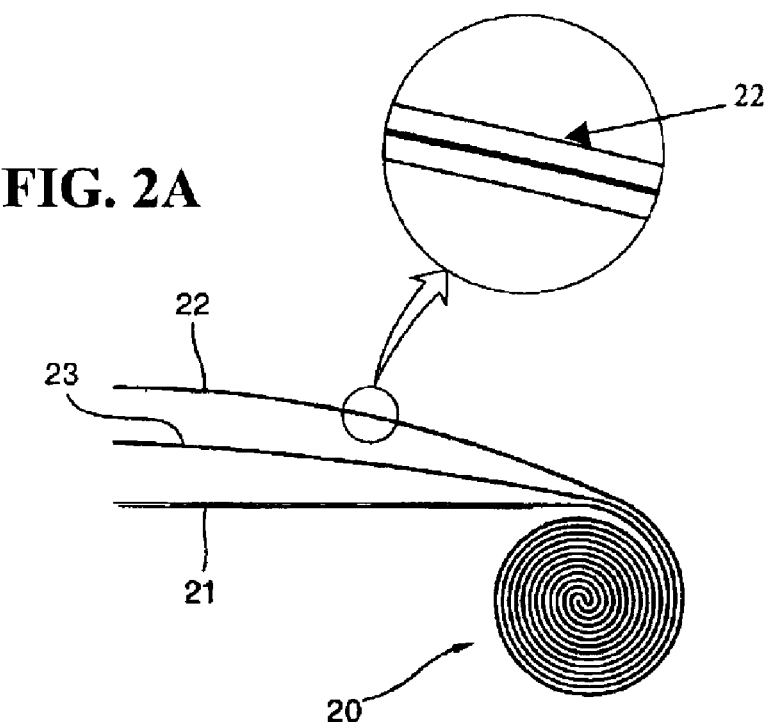
FIG. 2B

METHOD OF MANUFACTURING SECONDARY BATTERY

CROSS-REFERENCE TO RELATED APPLICATION

This application claims the benefit of Korean Application No. 2001-74955, filed Nov. 29, 2001, in the Korean Intellectual Property Office, the disclosure of which is incorporated herein by reference.

BACKGROUND OF THE INVENTION

1. Field of the Invention

The present invention relates to a method of manufacturing a secondary battery, and more particularly, to a method of manufacturing an improved secondary battery adapted to suppress gas exhaust from an electrode assembly sealed within a case of the secondary battery.

2. Description of the Related Art

According to the rapid advancement of small, lightweight and wireless electronic devices such as mobile phones, camcorders, notebook type computers and the like, high-energy density secondary batteries are under vigorous development as power sources for such devices. The secondary batteries are classified into lithium metal batteries using liquid electrolytes, lithium ion batteries and lithium polymer batteries using solid-state polymer electrolytes. The lithium polymer batteries are divided into solid polymer lithium batteries, which do not contain liquid organic electrolytes, and gel polymer lithium batteries, which contain liquid organic electrolytes, according to the kind of electrolyte used.

Lithium batteries use liquid electrolytes or solid electrolytes, solid polymer electrolytes, inter alia. In particular, lithium secondary batteries using polymer electrolytes are free from damage of devices due to leakage of electrolytic solution. Also, since electrolytes of lithium secondary batteries serve as separators, batteries can be made smaller. Also, high-energy density lithium secondary (i.e., rechargeable) batteries can be used as very convenient power sources. Owing to these advantages, much attention is being paid to the lithium secondary batteries as power sources or memory backup sources for portable electronic devices.

FIG. 1 illustrates an example of conventional lithium secondary batteries. Referring to FIG. 1, a secondary battery 10 includes an electrode assembly 11. The electrode assembly 11 includes a positive electrode plate and a negative electrode plate with a separator interposed there between, with the resulting structure being wound. The electrode assembly is in a case 12 which has an insulative case body 12a and a cover case 12b. The electrode assembly 11 is sealed in the case 12. Here, the insulative case body 12a wraps the electrode assembly 11 and has an accommodating portion 12c in which the electrode assembly 11 is seated, and the cover 12b is integrally formed with the insulative case body 12a. Also, the electrode assembly 11 has positive and negative electrode terminals drawn out therefrom.

A method of manufacturing the secondary battery 10 having the above-described configuration includes preparing a positive electrode plate and a negative electrode, preparing the electrode assembly 11 by winding a laminate structure of the positive and negative electrode plates with the separator interposed therebetween, pressing down the electrode assembly 11 to form the laminate structure into a plate-shaped structure, preparing the case 12, which includes the case body 12a and the cover 12b, the case body 12a having the accommodating portion 12c in which the electrode assembly 11 is seated and a gas chamber (not shown) connected to the accommodating portion 12c. The electrode assembly 11 is inserted into the accommodating portion 12c of the case 12, and the resultant structure is sealed therein using the cover 12b. The sealed resultant structure is such that the accommodating portion 12c and the gas chamber are connected to each other. Then, the electrode assembly sealed in the case is thermally fused and initially charged. The gas generated during the initially charging is exhausted into a gas chamber through a connecting path. The connecting path is then sealed and the gas chamber is removed. The secondary battery is then fully charged (so as to reach a saturated charge state).

However, the above-described manufacturing method of a secondary battery involves several problems. Since it is necessary for a separate gas chamber to exhaust and collect the gas generated during the initial charging, a considerable space of a battery case is consumed for installation of the gas chamber. Performing an extra operation for gas exhaustion results in high costs and increased man-hours, making it impossible to increase manufacturability. Also, the gas generated during charging tends to remain in the accommodating portion 12c due to relatively increased resistance when it is leaked to the gas chamber. Thermal fusion performed in such a state may adversely affect the performance and life characteristics of the battery.

SUMMARY OF THE INVENTION

To solve the above and other problems, it is an object of the present invention to provide a method of manufacturing a secondary battery which simplifies the manufacturing process and enhances the reliability in gas exhaustion by eliminating the necessity of a de-gassing operation using a gas chamber.

Additional objects and advantages of the invention will be set forth in part in the description which follows and, in part, will be obvious from the description, or may be learned by practice of the invention.

To achieve the above and other objects, a method of manufacturing a secondary battery according to an embodiment of the invention includes preparing a winding-type electrode assembly by interposing a separator between a positive electrode plate and a negative electrode plate and winding the resulting structure, initially charging the electrode assembly to remove the gas generated during charging, sealing the initially charged electrode assembly in a battery case, and fully charging the sealed electrode assembly.

According to an aspect of the invention, the method further includes, after preparing the winding-type electrode assembly, thermally fusing the electrode assembly to reduce a distance between electrode plates.

BRIEF DESCRIPTION OF THE DRAWINGS

The above and other objects and advantages of the present invention will become more apparent and more readily appreciated by describing in detail embodiments thereof with reference to the accompanying drawings in which:

FIGS. 2A through 2F are diagrams illustrating operations in a method of manufacturing a secondary battery according to an embodiment of the present invention.

DETAILED DESCRIPTION OF THE EMBODIMENTS

Figure 1:
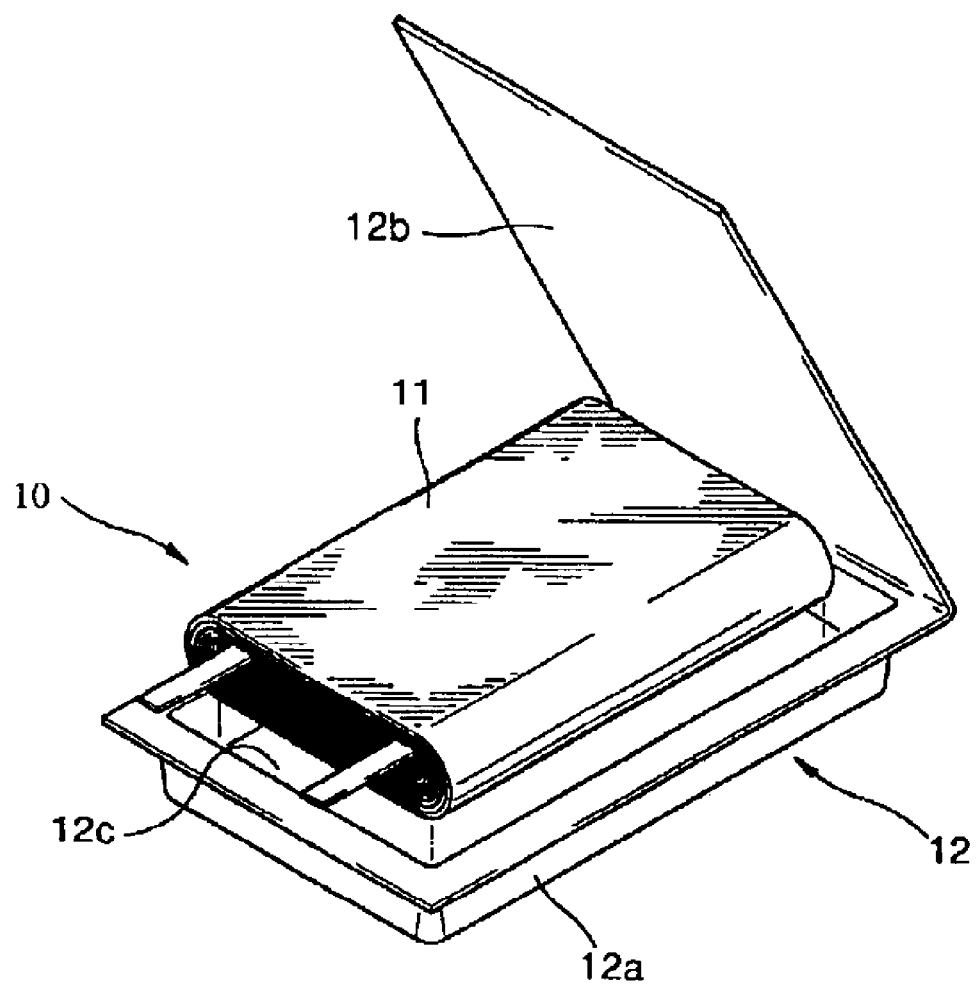
FIG. 1 is a perspective view of a general secondary battery.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2C:
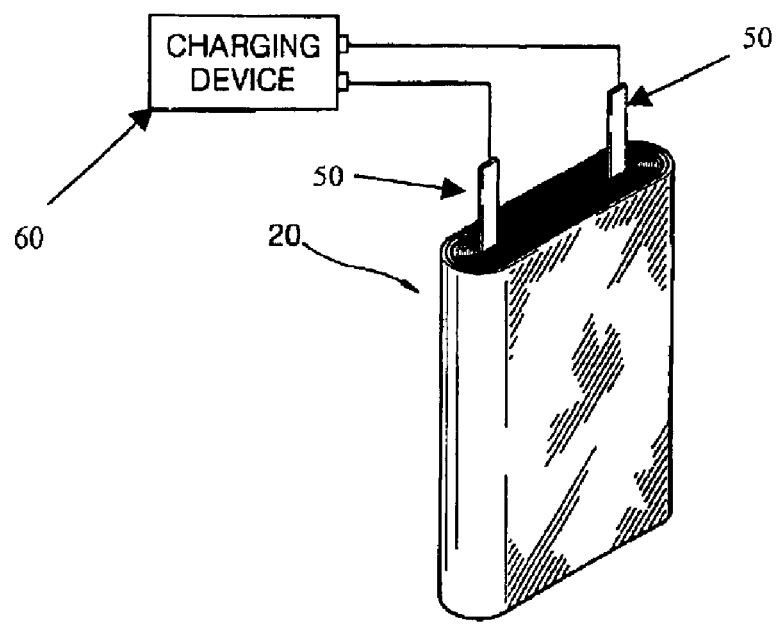

A method of a manufacturing a secondary battery, in which a jelly-roll type electrode assembly 20 is hermetically sealed within a case 30 and terminals 50 of the electrode assembly 20 protrude outward from the case 30, is shown in FIGS. 2A through 2F. Referring to FIGS. 2A and 2F, a positive electrode plate 21 and a negative electrode plate 22 are prepared in separate processes, and a separator 23 is interposed between the positive and negative electrode plates 21 and 22 to separate the electrode plates 21 and 22. The resultant structure is wound to prepare a winding-type electrode assembly 20. Then, as shown in FIG. 2B, the electrode assembly 20 is pressed down to form a jelly-roll type electrode assembly 20. According to an aspect of the invention, the electrode terminals 50 are then attached to the positive and negative electrode plates 21 and 22 after preparing the electrode assembly 20. According to the shown embodiment, the electrode assembly 20 is formed in a plate shape so as to minimize a space remaining after sealing the same in a battery case 30 (shown in FIG. 2E). However, it is understood that the electrode assembly 20 can have other shapes.

As shown in FIG. 2C, after completing the formation of the jelly-roll type electrode assembly 20, the electrode assembly 20 is initially charged using the electrode terminals 50. Specifically, the electrode terminals 50 are connected to a charging device 60, which charges the electrode assembly 20 so as to de-gas and activate active materials in the electrode assembly 20. At this time, the gas generated during charging is sufficiently exhausted. Experiments performed by the present inventor showed that gas was generated at 3.8 V or less in the initially charging step. Thus, a swelling phenomenon occurring in subsequently fully charging a battery can be prevented when the electrode assembly 20 is sealed in a battery case 30 (shown in FIG. 2E) after initially charging to reach less than 30% of the battery's capacity when fully charged, thereby reducing a thickness variation of the electrode assembly 20.

Figure 2D:
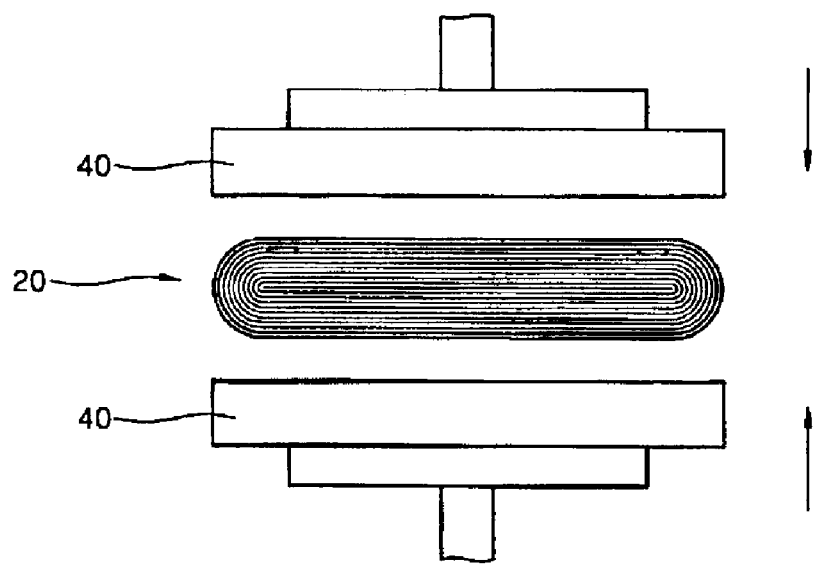
Figure 2E:
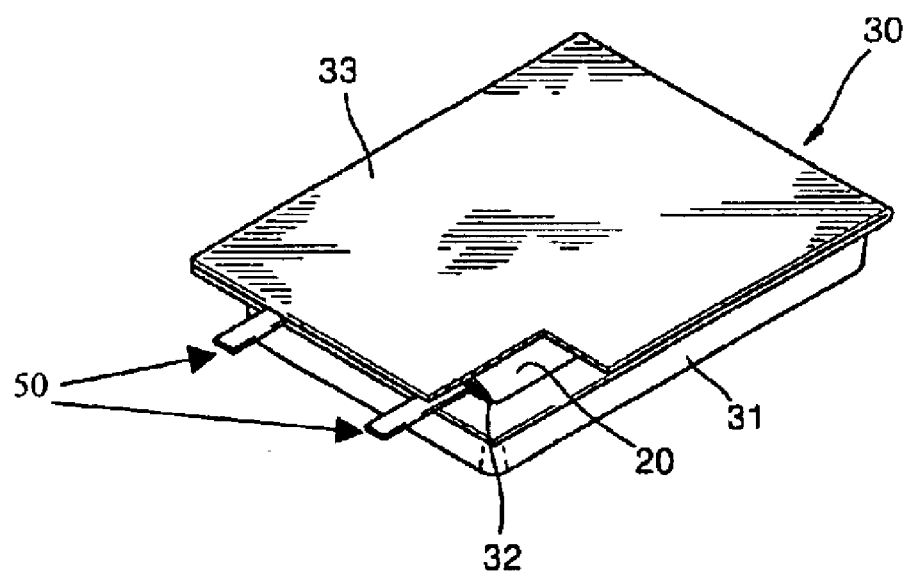

As shown in FIG. 2E, the electrode assembly 20 resulting after de-gassing is put into an accommodating portion 32 provided in a case body 31 and sealed using a cover member 33. Here, the terminals 50 of the electrode assembly 20 protrude outside the sealed portion of the case 30. According to an aspect of the invention, the initially charging shown in FIG. 2C is performed while the electrode assembly 20 is mounted in the case 30 and a portion thereof is exposed outside of the case 30.

According to an embodiment of the invention, as shown in FIG. 2D, thermal fusion and pressing are performed in order to further compact and decrease a distance between the separator 23 and the electrode plates 21, 22 of the winding-type electrode assembly 20 and to exhaust extra gas in the electrode assembly 20. The thermal fusion is performed while the electrode assembly 20 is pressed into a jelly-roll electrode assembly 20 as shown in FIG. 2D. The thermal fusion is performed such that hot upper and lower pressing panels 40 are pressed downward and upward with respect to the electrode assembly 20, respectively.

Finally, the electrode assembly 20 is sealed in the battery case 30 and is fully charged. However, it is understood that the electrode assembly need not be fully charged or charged until the battery is received by a user or customer.

While not shown, it is understood that additional operations may be performed, including operations relating to an insertion of electrolytic and other fluids. Additionally, it is understood that the separator 23 can be a solid electrolyte or be used in addition to a solid electrolyte that is further interposed between the electrode plates 21, 22.

The method of manufacturing a secondary battery according to the present invention has the following effects. First, since it is not necessary to separately install a gas chamber in a battery case, the space consumed by the battery case can be greatly reduced. Second, since the de-gassing operation to remove extra gas is not performed, the manufacturing process of the secondary battery is simplified and the manufacturability of secondary batteries is enhanced. Third, a deterioration in performance of a battery due to poor exhaustion of the gas generated during initial charging is prevented, and a swelling phenomenon due to gas generation is suppressed. Fourth, a deviation in capacity when the batteries manufactured by the above-described manufacturing process are fully charged, is reduced.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A method of manufacturing a secondary battery, comprising:

preparing a winding-type electrode assembly by interposing a separator between a positive electrode plate and a negative electrode plate and winding the resulting structure;

initially charging the electrode assembly to remove gas generated during the initial charging;

subsequent to the initially charging operation, sealing the initially charged electrode assembly in a battery case; and again charging the electrode assembly sealed in the battery case.

2. The method according to claim 1, further comprising, after said preparing the winding-type electrode assembly and prior to the initially charging operation, thermally fusing the electrode assembly to reduce a distance between the positive and negative electrode plates.

3. The method according to claim 1, wherein said initially charging operation comprises charging the electrode assembly to reach at or below 30% of capacity when fully charged.

4. The method according to claim 1, further comprising, after the electrode assembly is sealed in the battery case, thermally fusing the electrode assembly to reduce a distance between the separator and the electrode plates.

5. A method of manufacturing a secondary battery, comprising:

initially charging an electrode assembly so as to allow gas generated by the electrode assembly during said initial charging to escape from the electrode assembly, the electrode assembly comprising a separator that separates a positive electrode plate and a negative electrode plate; and sealing the initially charged electrode assembly within a battery case.

6. The method of claim 5, further comprising preparing the electrode assembly by interposing the separator between the, positive electrode plate and the negative electrode plate.

7. The method of claim 6, wherein said preparing the electrode assembly further comprises, after interposing the separator between the positive electrode plate and the negative electrode plate to prepare a resultant structure, winding the resultant structure to prepare a winding-type electrode assembly.

8. The method of claim 5, wherein said initially charging comprises charging the electrode assembly to 3.8 V or less.

9. The method of claim 5, wherein said initially charging comprises charging the electrode assembly to 30% or below of a total capacity of the electrode assembly.

10. The method of claim 5, further comprising again charging the electrode assembly sealed in the battery case.

11. The method of claim 10, wherein said again charging the electrode assembly sealed in the battery case comprises charging the electrode assembly to full capacity.

12. The method of claim 7, further comprising pressing the winding-type electrode assembly prior to the initially charging operation, to form planar external surfaces on the winding-type electrode assembly.

13. The method of claim 12, further comprising heating the winding-type electrode assembly prior to the initially charging operation.

14. The method of claim 13, wherein said heating the winding-type electrode assembly comprises heating the winding-type electrode assembly so as to reduce a distance between the separator and the positive and negative electrode plates.

15. A secondary battery comprising:
   an electrode assembly comprising a separator that separates a positive electrode plate and a negative electrode plate; and
   a case in which said electrode assembly is sealed,
   wherein said electrode assembly was initially charged so as to allow gas generated during the initial charging to escape from said electrode assembly prior to being sealed in said case.

16. The secondary battery of claim 15, wherein said electrode assembly was initially charged to at or below 30% of a total capacity of said electrode assembly prior to being sealed in said case.

17. The secondary battery of claim 16, wherein said electrode assembly comprises sequential layers, each layer comprising the positive electrode plate and the negative electrode plate separated by the separator.

18. The secondary battery of claim 17, wherein said electrode assembly comprises a winding-type electrode assembly produced by, after interposing the separator between the positive electrode plate and the negative electrode plate to provide a resultant structure, winding the resultant structure to prepare the winding-type electrode assembly.

19. The secondary battery of claim 18, wherein said electrode assembly was further pressed after the initial charging so as to form planar external surfaces on said electrode assembly to remove additional gas prior to being sealed in said case.

* * * * *

UNITED STATES PATENT AND TRADEMARK OFFICE
CERTIFICATE OF CORRECTION

PATENT NO. : 6,908,704 B2
DATED : June 21, 2005
INVENTOR(S) : Chan-hee Lee

It is certified that error appears in the above-identified patent and that said Letters Patent is hereby corrected as shown below:

<u>Column 4,</u>
Line 64, delete ",".

Signed and Sealed this

Thirty-first Day of January, 2006

JON W. DUDAS
*Director of the United States Patent and Trademark Office*